US009433322B2

(12) United States Patent
Axinte et al.

(10) Patent No.: US 9,433,322 B2
(45) Date of Patent: Sep. 6, 2016

(54) PORTABLE, SMOKELESS, INDOOR/OUTDOOR GRILL

(76) Inventors: Grigore Axinte, Bellevue, WA (US);
Vasilica A. Axinte, Bellevue, WA (US);
Daniela Axinte, Bellevue, WA (US);
Dragos Axinte, Bellevue, WA (US);
Harold Alexander Brown, Seattle, WA (US); Jeffrey Paul Mills, Barrington, IL (US); Joseph Patrick Sullivan, Issaquah, WA (US)

( * ) Notice: Subject to any disclaimer, the term of this patent is extended or adjusted under 35 U.S.C. 154(b) by 928 days.

(21) Appl. No.: 12/705,341

(22) Filed: Feb. 12, 2010

(65) Prior Publication Data

US 2010/0206291 A1 Aug. 19, 2010

Related U.S. Application Data

(60) Provisional application No. 61/153,150, filed on Feb. 17, 2009.

(51) Int. Cl.
*A47J 27/00* (2006.01)
*A47J 37/07* (2006.01)
*A47J 36/02* (2006.01)
*A47J 37/06* (2006.01)

(52) U.S. Cl.
CPC ........... *A47J 37/0709* (2013.01); *A47J 36/025* (2013.01); *A47J 37/06* (2013.01); *A47J 37/0713* (2013.01)

(58) Field of Classification Search
CPC .... A47J 37/0709; A47J 37/06; A47J 36/025; A47J 27/00
USPC ..... 126/25 R, 215, 275, 275 R, 369; 99/339, 99/444
See application file for complete search history.

(56) References Cited

U.S. PATENT DOCUMENTS

| 1,456,238 | A | * | 5/1923 | Ivancic | 126/275 R |
|---|---|---|---|---|---|
| 2,001,615 | A | * | 5/1935 | Karten | 126/275 R |
| 2,072,036 | A | * | 2/1937 | Horsman | F24B 1/003 |
| | | | | | 126/275 R |
| 3,088,393 | A | * | 5/1963 | Huckabee | A47J 37/06 |
| | | | | | 126/25 A |
| 4,051,836 | A | * | 10/1977 | Lagunilla-Leca | 126/275 R |
| 4,694,816 | A | | 9/1987 | Fabbro | |
| 4,729,297 | A | * | 3/1988 | Iranzadi | 99/401 |
| 5,156,083 | A | | 10/1992 | Leighton | |

(Continued)

*Primary Examiner* — Gregory Huson
*Assistant Examiner* — Nikhil Mashruwala
(74) *Attorney, Agent, or Firm* — FSP LLC

(57) ABSTRACT

A cooking device includes a gridiron; a tray positioned to catch material that falls from the gridiron; a cover formed to at least partially enclose the gridiron; a chimney having a chimney base and a chimney top, the chimney base and chimney top forming an airflow passage through the chimney; the chimney, gridiron, and cover arranged such that when the chimney base is placed over a heat source, convection occurs from the chimney base and out through the chimney top, to the cover, and from the cover toward the gridiron, the cover formed with a protruding inner wall above the chimney which forms a junction to channel substantially all of the convection in a motion outward toward sides of the cover and down toward the gridiron; the chimney base and the tray arranged such that when the chimney base is placed over the heat source, heat is radiated from the chimney base toward the tray; the chimney top and gridiron arranged such that when the chimney base is placed over the heat source, heat is radiated from the chimney top laterally across an upper surface of the gridiron; and the gridiron and the tray formed to at least partially surround the chimney top, the chimney top protruding through the gridiron and extending above it.

11 Claims, 20 Drawing Sheets

(56) References Cited

U.S. PATENT DOCUMENTS

| | | |
|---|---|---|
| 5,579,680 A | 12/1996 | Graur |
| 5,862,741 A | 1/1999 | Wodeslavsky |
| 5,967,135 A | 10/1999 | Shariat |
| 5,970,858 A * | 10/1999 | Boehm et al. .................. 99/446 |
| 7,059,318 B2 | 6/2006 | Cornfield |
| 2006/0213497 A1 * | 9/2006 | Orozco ............... A47J 37/0786 126/41 R |
| 2007/0199557 A1 * | 8/2007 | von Kaenel ................ 126/25 R |
| 2009/0301463 A1 * | 12/2009 | Park ....................... A47J 27/00 126/25 R |

* cited by examiner

PORTABLE, SMOKELESS, INDOOR/OUTDOOR GRILL

This application claims the benefit of U.S. Provisional Patent Application No. 61/153,150 filed 17 Feb. 2009, all of which is incorporated herein by reference.

TECHNICAL FIELD

This disclosure relates generally to improvements to a cooking apparatus utilizing external heat sources.

BACKGROUND

Nearly 75 million Americans barbecued in 2007, buying 900,000 tons of charcoal briquettes. The average American grill owner spends about four and one-half hours grilling per week during the summer. Memorial Day, Labor Day, and Independence Day are American holidays on which outdoor grilling has almost become a tradition. Despite the popularity of outdoor grilling, almost 20% of Americans prefer to grill indoors.

Cooking grills for both outdoor and indoor use are well known and commercially available. Some portable, smokeless, indoor/outdoor cooking grills utilize external sources of heat. Many existing portable grills utilizing external sources of heat present the disadvantage of having multiple components. None of these existing grill systems are completely satisfactory solutions to the problem of portable indoor/outdoor grilling.

There is a need for a system that overcomes limitations of current grilling systems, as well as providing additional benefits.

SUMMARY

Presented first are a brief summary of some embodiments and aspects of the invention. Some simplifications and omissions may be made in the following summary; the summary is intended to highlight and introduce some aspects of the disclosed embodiments, but not to limit the scope of the invention. Thereafter, a detailed description of some illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

Outdoor gas or charcoal grills are well-known. However they have certain disadvantages, such as they may: run out of propane or charcoal; cause lots of smoke due to drippings onto the burners; be prohibited in some areas, like apartments, due to fire danger; or not work well in cold weather.

Indoor grills are also well-known. However, many have the disadvantages that they emit smoke that will set off fire alarms and are difficult to clean. Electric grills often dry the meat that is being cooked and devoid it of flavor. Also, electric grills will not work if the electricity is out.

Embodiments of the disclosed inventions include a portable, smokeless, indoor/outdoor grill that utilizes the existing heat source of a regular stove for indoor use and a gas tank, camp grill, or camp fire for outdoor use. Some embodiments are configured to provide an efficient heat transfer that will reduce the cooking time. Some embodiments disclose ways to collect grease and drippings for smokeless operation, which is beneficial for indoor grilling. Some embodiments disclose methods for marinating the food while it is cooking.

In one embodiment, an aspect of the present invention proposes a compact version, where the grill pan and grill cover are connected through a hinge system, thus eliminating the possibility of accidental burns while moving the cover. Additionally, some embodiments disclosed herein require less space for storage and use. For easy cleaning, the grill cover and the grill pan can be separated by unscrewing the two knobs that are part of the hinge assembly.

Under another embodiment of the invention, an additional feature is the double wall of the grill cover. While in use, the outer wall does not become as hot, and therefore unsafe, as it would if the grill cover was made of only one sheet of metal. While in use, the double wall traps hot air in between the two layers, thus preserving an even temperature inside the grill, and reducing energy consumption by reducing the warm-up time.

The curved front wall of the grill pan allows the heat to reach the food being cooked. Additionally, the shorter front wall of the grill pan accelerates movement of the hot air to the food being cooked both above and below the food, resulting in a cooking time half of those comparable grills.

In some embodiments, the grill pan may provide additional functions, such as: (1) act as a grease collector, improving cleanliness of the grill; (2) when filled with liquid (which may be water, marinade, or any other suitable liquid), eliminate the smoke typically created when grease touches a hot, dry surface; (3) when the tray is filled with liquid, create the necessary moisture through vaporization to prevent the drying out of the food; and/or (4) when spices, marinade, dressings, or sauces are added to the water, it becomes a marinating vessel, which will add flavor to the food being cooked.

Embodiments of the innovative indoor/outdoor grill can be disassembled and put into the dishwasher for easy cleaning. Food drippings are caught in a liquid-filled tray, further enhancing easy cleanup and preventing smoke and flare-ups. The liquid in the tray creates vapor circulation to keep the food moist during cooking.

The indoor/outdoor grill can be used with many different heat sources, such as a stovetop burner, outdoor gas grill, coals, etc. Because the food being cooked is not directly exposed to the heat source, the food will cook uniformly without burning. Some embodiments of the innovative grill disclosed will heat the air above the food in a range from 400 F to 900 F, while the liquid in the tray will heat from 120 F-200 F. By creating air temperatures as high as 900 F, the grill can sear the food, which locks in the flavor and makes it taste like food cooked on an outdoor grill or a restaurant grill.

Figure 1:
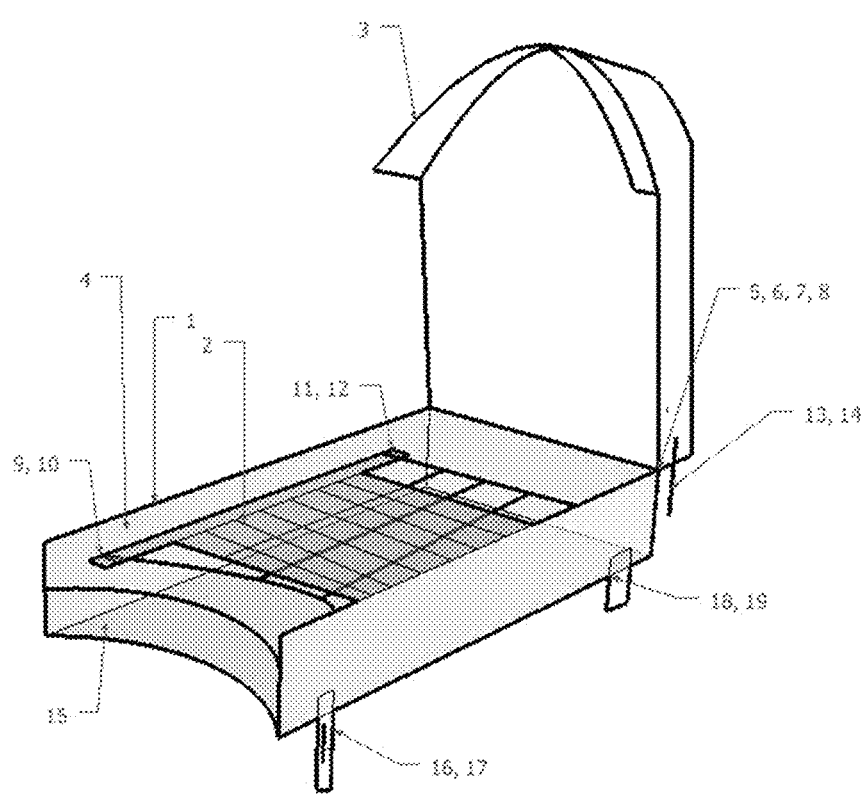
FIG. 1 shows a view of an embodiment of a portable indoor/outdoor grill.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number may refer to the Figure number in which that element is first introduced (e.g., element 505 is first introduced and discussed with respect to FIG. 5).

Figure numbers followed by the letters "A," "B," "C," etc. may indicate that two or more Figures represent alternative or related embodiments or methods under aspects of the invention.

DETAILED DESCRIPTION OF THE ILLUSTRATED EMBODIMENTS

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

FIG. 1 shows a view of an embodiment of a portable indoor/outdoor grill according to some aspects of the present invention. FIG. 1 shows a grill pan 1, a gridiron 2, and a grill cover 3. The portable, smokeless indoor/outdoor grill shown in FIG. 1 may be made of materials such as sheet metal, aluminum, aluminum alloy, light-gauge stainless steel, cast iron, or other suitable materials. Different exterior finishes such as powder coating, stainless steel, or plated steel may be used. The inside of the portable, smokeless indoor/outdoor grill surface 4 may have a non-stick coating such as fluorinated fluoropolymers, Teflon®, or similar materials. Additionally, for consumers' safety, the surface may have an anti-microbial coating such as silver-based fluoropolymers.

FIG. 1 shows the grill cover 3 securely connected to the grill pan 1 through a set of hinge systems 5 and 6, the hinge systems secured to the grill ban 1 via threaded knobs 7 and 8. For easy clean up, the grill pan 1 can be separated from the cover by unscrewing the knobs 7 and 8. Knobs 7 and 8 are just one of the many possible mechanical devices that could be used to create an attachment and thus the possibility of separation between the grill pan 1 and the cover 3. The food is supported by gridiron 2, which rests on grill supports 9, 10, 11, and 12. The gridiron 2 is rectangular in shape and it may be constructed of materials such as carbon steel wire, galvanized iron wire mesh, stainless steel crimple wire mesh, or similar rustproof materials. The gridiron 2 may also be coated with a non-stick coating such as fluorinated fluoropolymers, Teflon®, or similar materials. Additionally, for consumers' safety, the gridiron 2 may also feature an anti-microbial coating such as silver-based fluoropolymers.

In the embodiment shown in FIG. 1, the grill cover 3 has two back legs 13 and 14, which may be adjusted to create a 90-degree angle with the stove's surface. The legs may be made of the same material as the grill pan 1 and may have a leg cap made of an anti-slippery material such as rubber or other materials in the class of thermoplastic elastomers.

Figure 2:
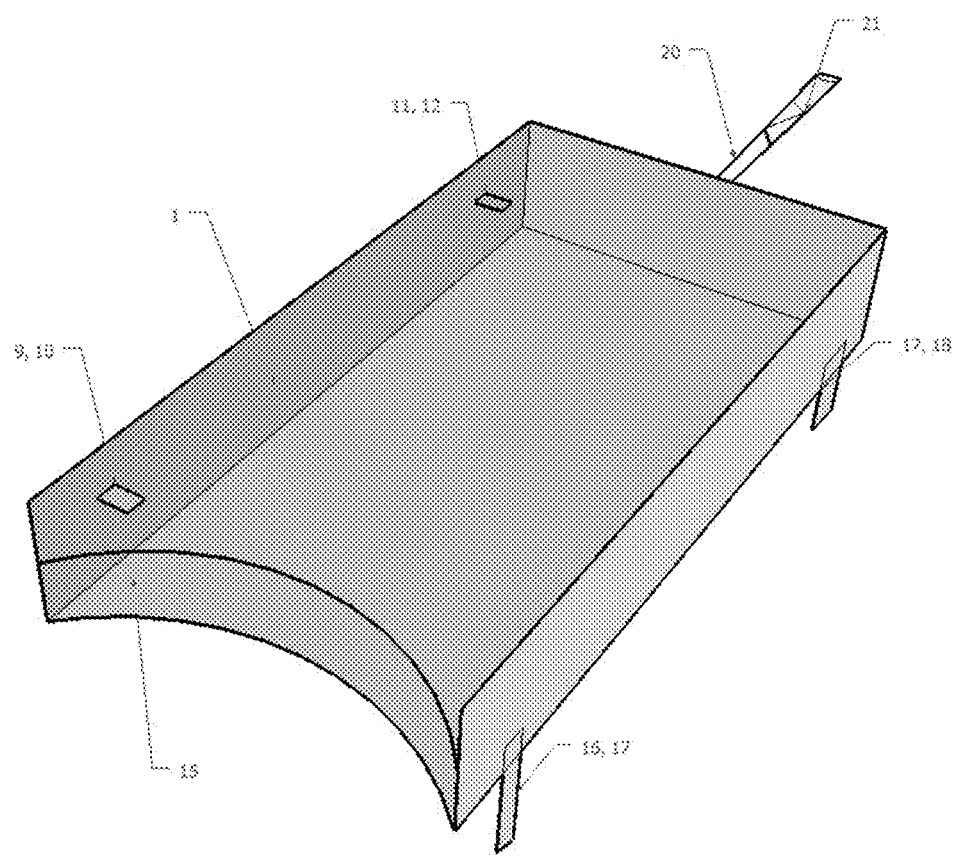
FIG. 2 shows a perspective view of the grill pan according to an embodiment of the invention.

FIG. 2 shows an embodiment of the grill pan 1 according to some aspects of the present invention. In this embodiment, the grill's front wall 15 is curved to fit a heat source such as a round shape natural gas, electric, or propane burner. The grill's front wall 15 is shorter than its side walls, allowing the hot air created by the heat source to reach both sides of the food being cooked in a simultaneous and rapid manner. The grill pan rests on four legs 16, 17, 18, and 19. The legs 16, 17, 18, and 19 may be adjustable in some embodiments to allow adjustment of the height between the flat surface of the stove and the heat source. The legs may be made of the same material as the grill pan and may have a leg cap made of an anti-slippery material such as rubber or other materials in the class of thermoplastic elastomers.

The grill pan 1 may be filled with water, marinade, dressing, sauces, or other liquids. The liquid, subjected to the direct hot air circulated inside the grill will create moisture for cooking a healthy, natural meal, thus reducing the risk of drying or overcooking the food. Additionally, the grill pan 1 can also be used as a marinating dish, by adding spices, flavored marinades, dressings, or sauces, and woodchips to the water.

The grill pan 1 may also be used for the collection of grease. When the grill pan 1 contains liquid, the grease and juices from meat being cooked on the grill will drip on top of the liquid, thus eliminating the smoke that is usually created when fat and juices are dripping on a hot surface.

In the embodiment shown, the grill pan 1 has a handle 20, which may fold upward for easy storage through a hinge or other suitable mechanism. Grill handle 20 may be made of materials such as sheet metal, aluminum, aluminum alloy, light-gauge stainless steel, cast iron, wood, or other suitable materials. The material may have an exterior finish such as powder coating, stainless steel, or plated steel. For safe handling, the grill handle 20 has a cover 21 to provide an anti-slippery surface when the grill is being handled. The grill handle cover 21 is made of materials in the class of thermoplastic elastomers, silicone-based rubber, or other thermally insulating materials.

Figure 3:
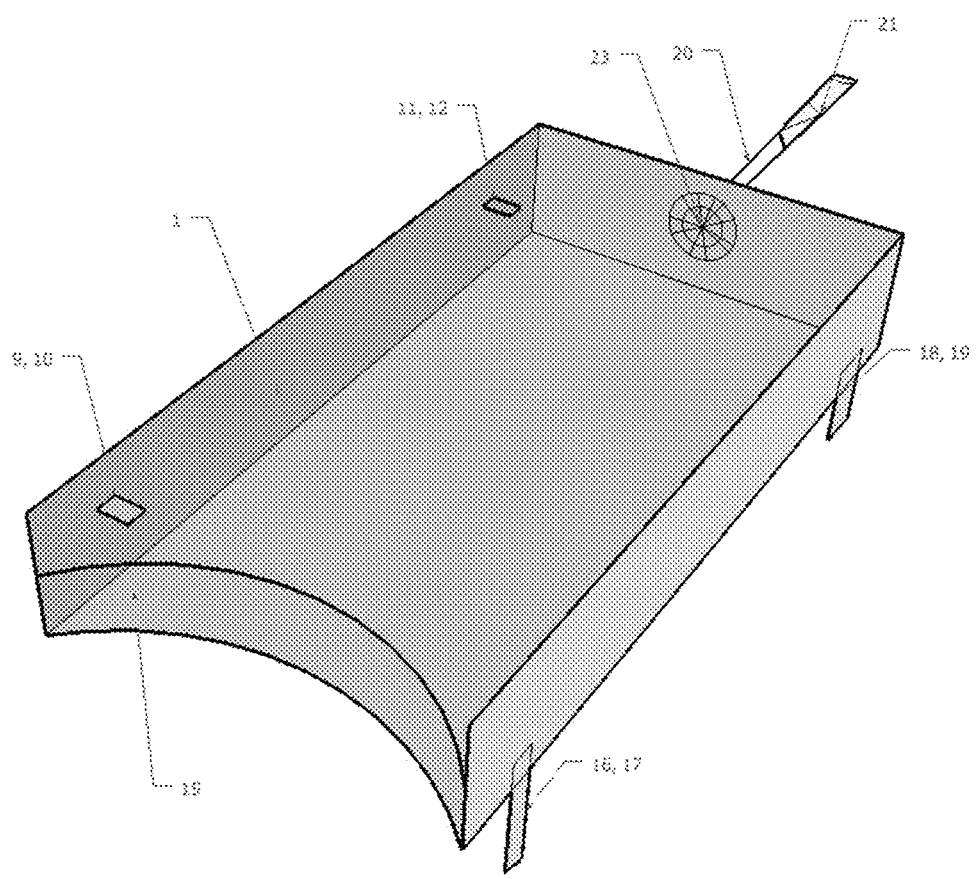
FIG. 3 shows a perspective view of an alternative embodiment of the grill pan.

FIG. 3 shows an alternative embodiment of the grill pan 1. A small electrical fan 23 is added to aid circulation of the hot air provided by the heat source. This circulation provides faster air movement through the grill and faster cooking.

Figure 4:
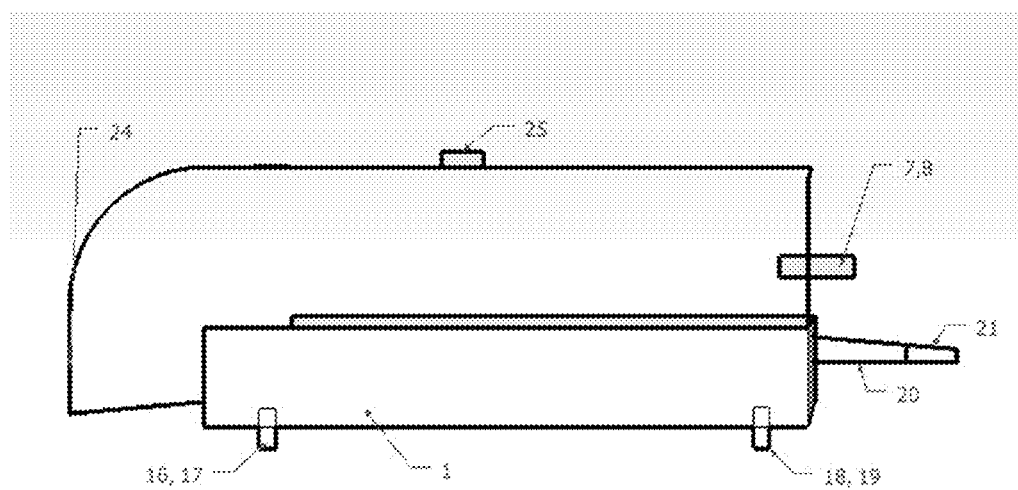
FIG. 4 shows a side view of an embodiment of the grill in a closed position.

FIG. 4 shows an embodiment in which grill cover 3 covers the electrical, gas, or propane burner completely. This and other embodiments of grill cover 3 may have a double wall which may serve one or more purposes, such as: (1) reducing the temperature of the exterior wall, thus preventing accidental burns to the user; and/or (2) the hot air trapped in between the layers of the double wall preserves an even temperature inside the grill and reduces warm-up time and energy consumption. In the embodiment shown, the double wall of grill cover 3 has an inside slope 24 on the end that sits over the heat source. The inside slope 24 forces the hot air generated by the heat source to follow a circular path inside the grill. In some embodiments, the grill cover 3 reaches and rests on the flat surface (such as a stove top, etc.) surrounding the electrical, natural gas, or propane heat source, which reduces heat loss and cooking time. However, in embodiments in which the grill cover rests on the surface surrounding the heat source, it is preferable to have air holes in the grill cover near where it contacts the surface to let sufficient air into the grill for combustion and convection to occur. In the embodiment shown, the grill cover 3 has a handle 25 to help in opening and closing the grill cover 3. The grill cover handle 25 may be made of carbon steel wire, galvanized iron, wood, or similar rustproof materials. For safe handling, the grill cover handle 25 may have a cover made of anti-slippery and heat-resistant material such as thermoplastic elastomers, silicone-based rubber, or similar materials.

Figure 5:
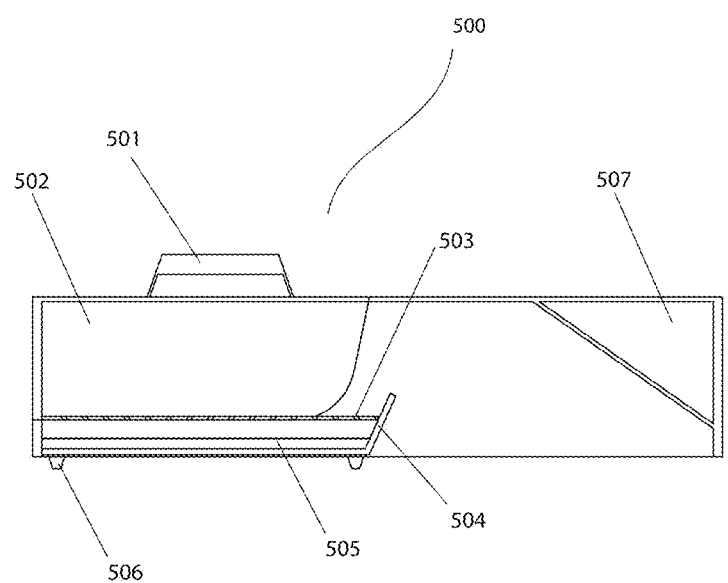
FIG. 5 shows a view of an embodiment of a portable indoor/outdoor grill.

FIG. 5 shows a mid-line cut-away diagram of an embodiment of an indoor/outdoor grill 500, according to some of the innovations disclosed. The grill 500 has a handle 501 attached to lid 502, which is preferably attached to the body of grill 500 with hinges for ease of opening and closing. Grill 500 may be supported above the cooktop surface, a stovetop for example, by feet 506 disposed at various points on the bottom of grill 500. Feet 506 maintain an appropriate distance between the cooktop and the grill, allowing an adequate flow of air to maintain combustion and convection. By limiting the surface area in physical contact with the cooktop, the feet 506 also help the grill 500 retain the high cooking temperatures required for searing meat by avoiding unnecessary thermal conduction into the cooktop. In some embodiments, feet 506 are adjustable so that grill 500 can be raised to allow suitable air flow depending upon the needs of a particular heat source. For example, a gas burner may require more air flow than an electric burner and thus a larger separation between the cooktop and the grill 500. A gridiron 503 sits above a tray 504 in which liquids 505 or flavorings may be placed. The liquids or flavorings 505 may enhance the cooking process by moderating the temperature and humidity inside grill 500. The bottom of grill 500 has a cutout distal to the gridiron 503 that may be positioned over an external heat source, such as a stove burner, coals, or campfire. Heat deflector 507 is positioned at least partially above the cutout and deflects thermal energy and convection currents into the gridiron 503 area.

Figure 5A:
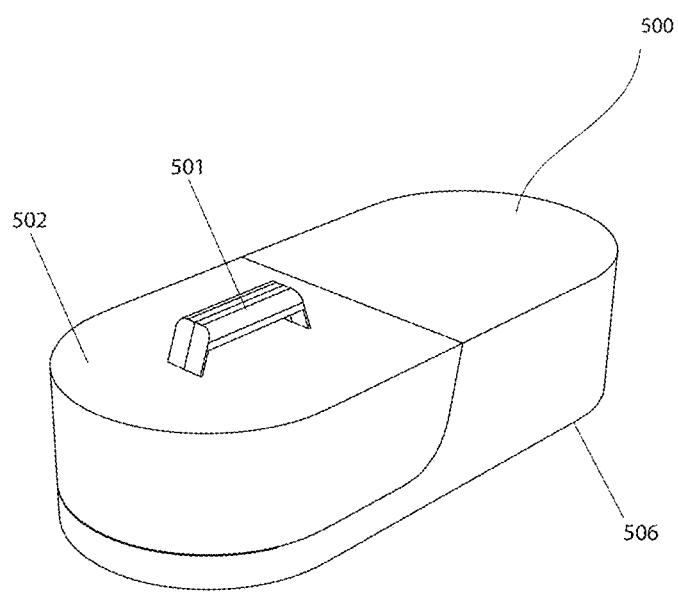
FIG. 5A shows a view of an embodiment of a portable indoor/outdoor grill.

FIG. 5A shows an exterior view of grill 500 with lid 502 in the closed cooking position. Handle 501 is used to lift lid 502. Feet 506 disposed on the underside of grill 500 may be used to adjust the separation or air gap between the grill and the cooktop or surface on which grill 500 rests.

Figure 5B:
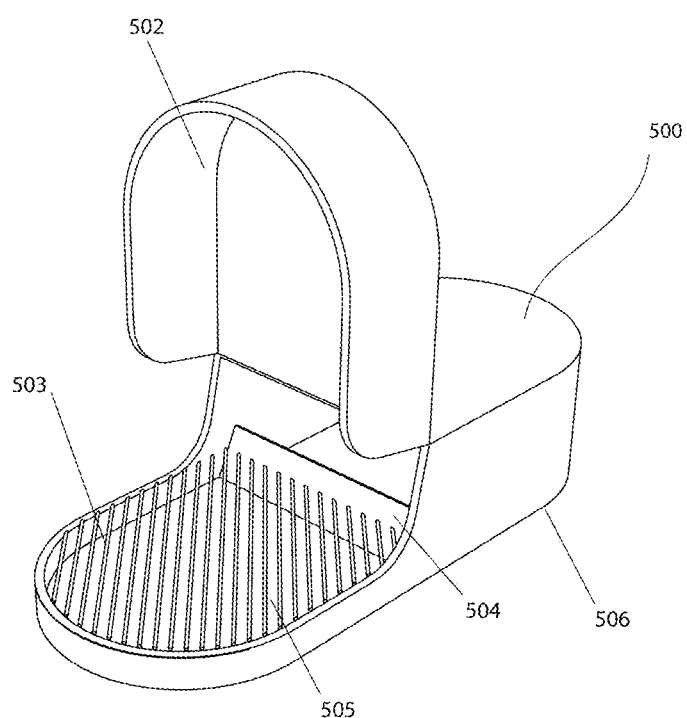
FIG. 5B shows a view of an embodiment of a portable indoor/outdoor grill.

FIG. 5B shows an exterior view of grill 500 with lid 502 in the open position. Gridiron 503 is supported above liquid 505 in tray 504. The cutout, visible beyond tray 504, is placed above a heat source. The cook will place food on gridiron 503; water, spices, marinade and or woodchips in tray 504; and close lid 502 to begin cooking the food.

Figure 5C:
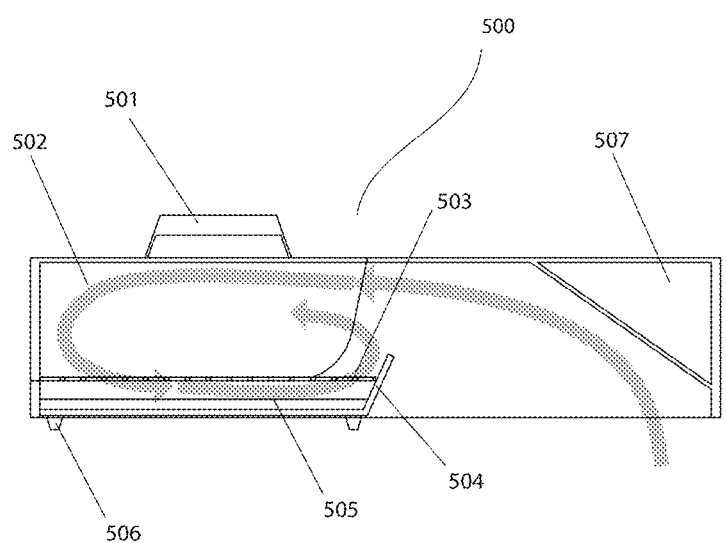
FIG. 5C shows thermal convection patterns within the portable indoor/outdoor grill embodiment shown in FIG. 5.

FIG. 5C is a heat flow diagram that shows convection currents originating from the external heat source and passing into the cooking area above and below gridiron 504. Heat deflector 507 guides the convection currents toward the cooking area as shown. Additionally, heat deflector 507 will radiate heat energy toward the cooking area.

Figure 6:
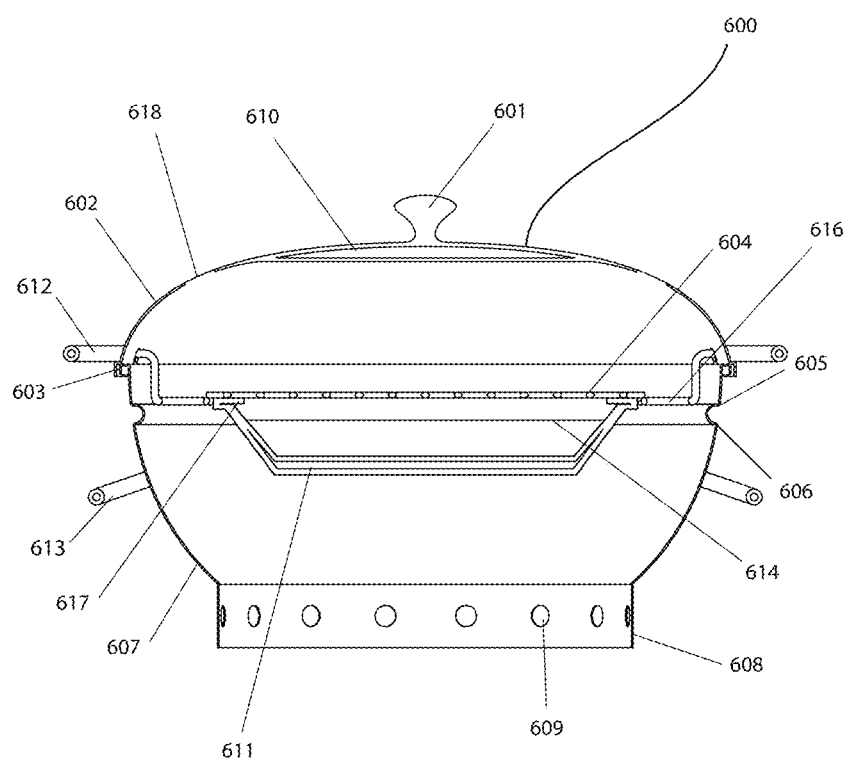
FIG. 6 shows a view of an alternative embodiment of a portable indoor/outdoor grill.

FIG. 6 shows a two-dimensional vertical cutaway view along the midline of an embodiment of an indoor/outdoor grill 600, according to some of the innovations disclosed. An advantage of this and similar vertical configurations over that shown in FIG. 5 is its smaller footprint. Handle 601 is preferably a knob or similar shape to prevent the user's fingers from coming in direct contact with the hot surface of lid 602. Lid 602 fits inside and is supported by lip 603. Lid 602 may have a double-wall 610 construction that provides thermal insulation to the knob area, the interior surface of which acts as a reflector of radiant energy onto the food being cooked. In the presently preferred embodiment, lid 602 is made of stainless steel or glass. An advantage of a glass lid is that the user can observe the food as it cooks. Some embodiments of lid 602 may have a porcelain coating to enhance thermal insulation and prevent color changes due to high heat.

Grill 600 includes a gridiron 604 on which food is cooked. The gridiron 604 sits on a tray assembly that includes a double-walled tray 611. The tray assembly has handles 612 so that it may be easily lifted out of grill 600. In the presently preferred embodiment, the lid 602 can stay on when the tray assembly is lifted out of the grill 600. Leaving the lid on keeps the food warm. In the embodiment shown in FIG. 6, the handles 612 protrude through cutout holes in lid 602. The base 607 of grill 600 supports the tray assembly on a ledge defined by an upper edge 605 and lower edge 606. In an alternative embodiment, the tray assembly could be supported by its handles 612 resting on lip 603.

In the embodiment shown, grill 600 has tray assembly with a double-walled tray 611 for holding water, spices, marinades, woodchips or other substances for imparting flavor, moisture, and/or tenderness to the cooked food. The tray 611 is preferably centered over the heat source for even distribution of heat to the trays contents. The tray 611 also serves to protect the food on gridiron 604 from direct exposure to the heat source, preventing the food from overcooking and drying out. FIG. 6 shows a liquid 614, such as spiced water in the tray 611. The double-wall configuration of tray 611 provides a smooth thermal gradient and prevents its contents from overheating, evaporating too fast, or boiling. Tray 611 and its contents may act as a heat capacitor, or reservoir, and continue providing heat to gridiron 604, or other components of the cooking system, via conduction after the heat source is removed.

Base 607 also may have handles 613 for lifting the grill 600. The bottom of base 607 rests on a cylindrical spacer 608 that encircles the heat source. The spacer 608 is perforated with air holes 609 that permit air flow for combustion and convection within the grill 600. The spacer 608 may be permanently attached to base 607 or may be a separate piece on which base 607 can be placed when cooking. In some embodiments, the height of spacer 608 may be adjustable to allow for variation in the distance of gridiron 604 and tray 611 from the heat source. Although air holes 609 are shown as circular and evenly spaced, they may be any shape or configuration that permits adequate airflow for combustion and convection.

Figure 6A:
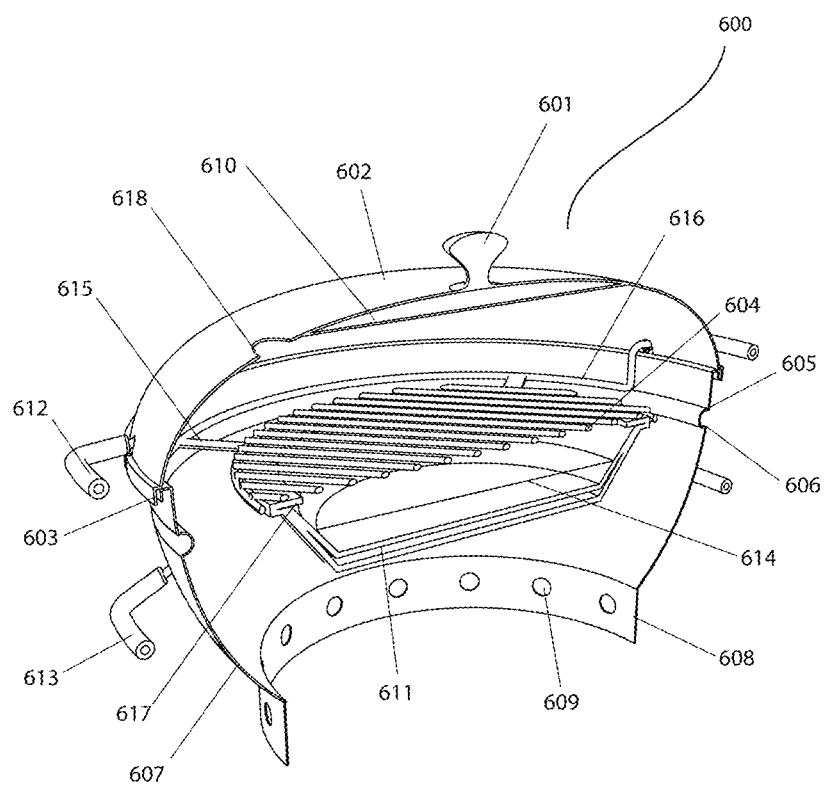
FIG. 6A shows a view of the portable indoor/outdoor grill shown in FIG. 6.

FIG. 6A shows a three-dimensional section view of the grill shown in FIG. 6. In the embodiment shown, spacer 608 is part of, or permanently attached to, base 607. The tray assembly consists of outer support ring 616, radial arms 615, tray 611, and handles 612. The tray assembly handles 612 protrude through cutouts in lid 602 and attach to tray support ring 616. In various embodiments, handles 612 can either be welded to support ring 616 or formed integral to support ring 616 (the integral embodiment is shown in more detail in FIG. 6C). Double-walled tray 611 is supported over the heat source by radial arms 615 that connect between tray 611 and tray support ring 616. In this embodiment, gridiron 604 rests on tray 611, with the outer ring of gridiron 604 fitting around the lip of tray 611 as shown. The cooking process is enhanced by heat transfer due to convection from air heated by the heat source, conduction from the tray 611 to the gridiron 604, convection from steam from the contents 614 of tray 611, and radiation from the lid 602. Knob 601 may be used to lift lid 602 so that the tray assembly may be removed from the grill 600 via handles 612 or the tray assembly can be removed with the lid remaining in place, as discussed above. Double-walled tray 611 may have lips 617 to prevent the tray's contents from spilling when moved.

Figure 6B:
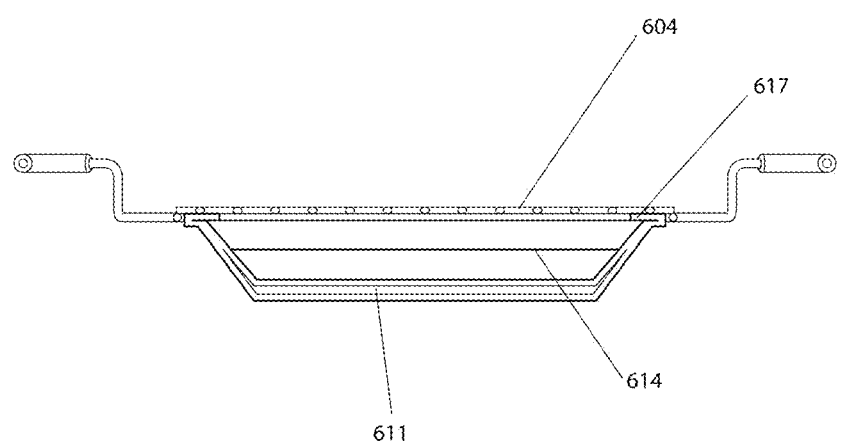
FIG. 6B shows a view of an embodiment of a tray for the grill of FIG. 6.

FIG. 6B shows a cut-away view of the tray assembly of FIG. 6, removed from grill 600 and without lid 602. In the embodiment shown, the lip 617 is formed from the body of the tray 611 and projects inward over the tray's contents to prevent spilling the liquid when the tray assembly is picked up.

Figure 6C:
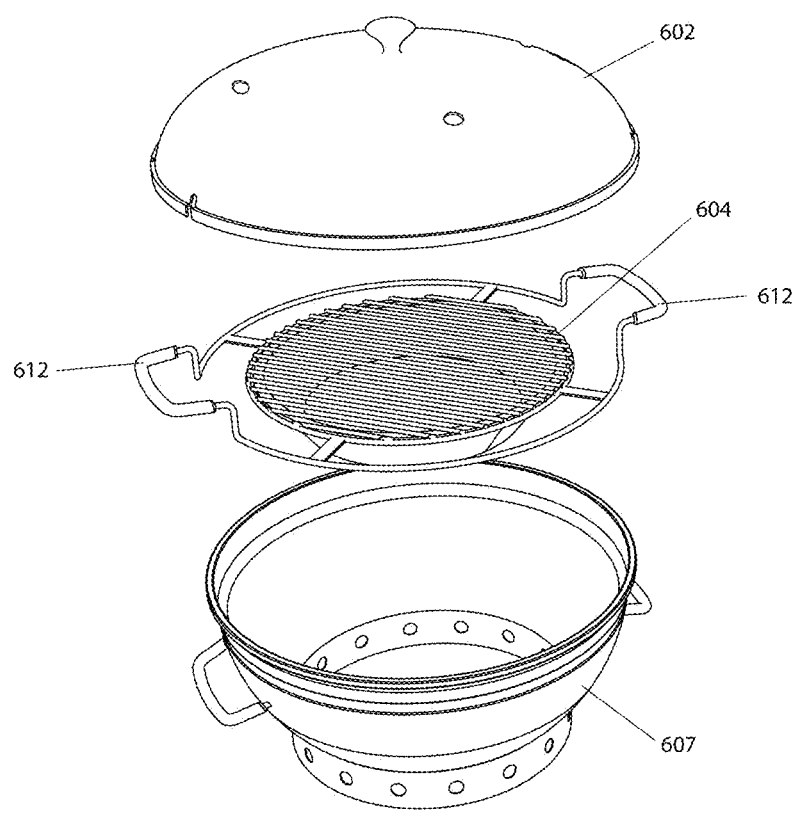
FIG. 6C shows a simplified exploded view of the grill of FIG. 6.

FIG. 6C shows an exploded view of grill 600. This view clearly shows the integral handle 612 formed from the same wire stock as the support ring. Although this embodiment may be preferred for some manufacturing techniques, those of skill in the art understand that there are many equivalent ways to attach handles to the support ring. This view also clearly shows the cutouts in lid 602 through which the handles 612 protrude. Additionally, vents can be seen in the top of lid 602. With the vents closed the temperature at the gridiron 604 surface first rises to over 650° F. and then drops to less than 550° F. As the water vaporizes, a saturated steam is created in the grill chamber. This steam absorbs a lot of energy but as it becomes more saturated, the temperature at the gridiron 604 actually drops and the surface temperature of base 607 rises. With the vents opened, the gridiron temperatures shoot up to 750° F. and then climb steadily to over 800° F. Conversely, the surface of base 607 is much cooler with the vents open.

Figure 6D:
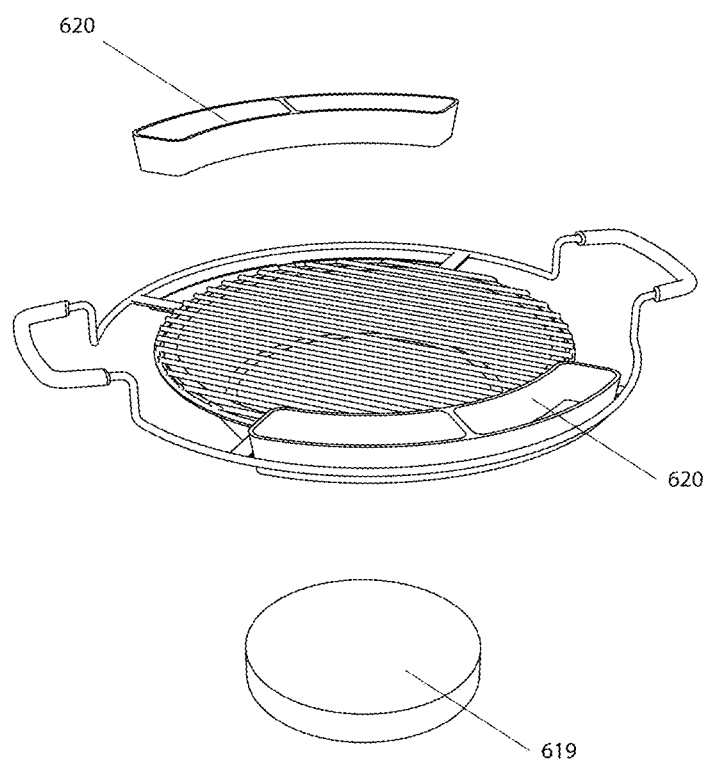
FIG. 6D shows the tray assembly of the grill of FIG. 6 along with the serving stand and sauce cups.

FIG. 6D shows the tray assembly with serving stand 619 and sauce cups 620. After cooking, the tray assembly can be removed from the grill 600 and placed on the dinner table on serving stand 619. Sauce cups 620 can be filled with various sauces and held between the radial arms of the tray assembly as shown. The lid 602 can also be kept over the apparatus during serving, to preserve the temperature of the food or to prolong cooking.

Figure 6E:
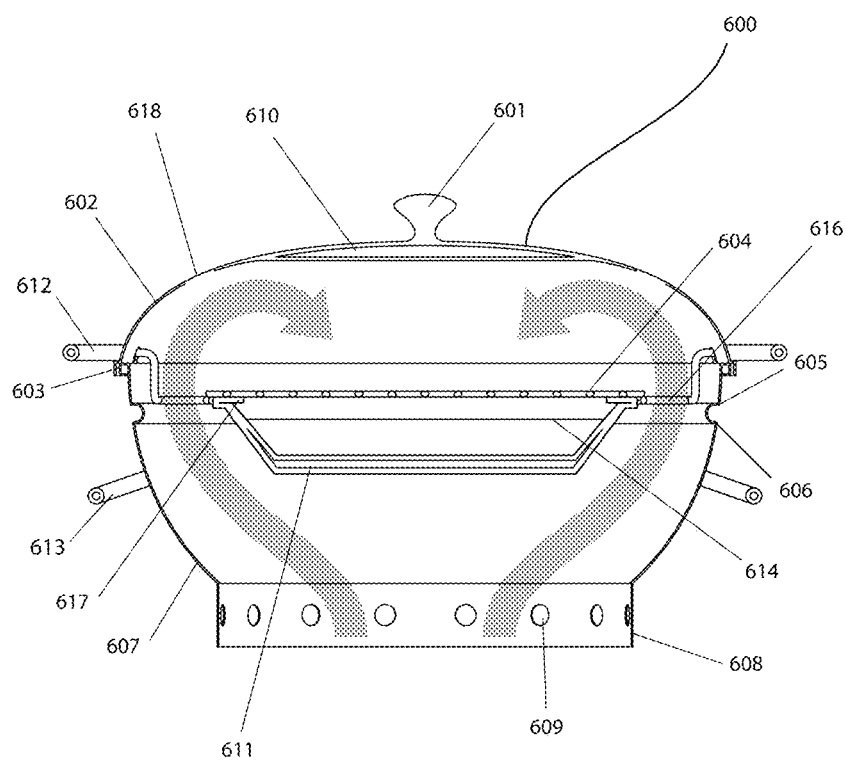
FIG. 6E shows thermal convection patterns within the portable indoor/outdoor grill embodiment shown in FIG. 6.

FIG. 6E is a heat flow diagram that shows convection currents originating from the external heat source, passing through the gaps between the radial arms 615 and into the cooking area above and below gridiron 604. As can be seen in FIG. 6E, the convection currents will also heat the bottom of double-walled tray 611 and its contents 614. Additionally, the double-walled area 610 of lid 602 will radiate heat energy toward the cooking area and reduce the temperature of the exterior surface of lid 602, increasing user safety. Lid 602 also has vents 618 which help increase the temperature in the cooking area to more than 700 F. Although not shown in the drawing, the vents preferably have a mechanism to adjust them open or closed such as a sliding or rotating mechanism.

Figure 7:
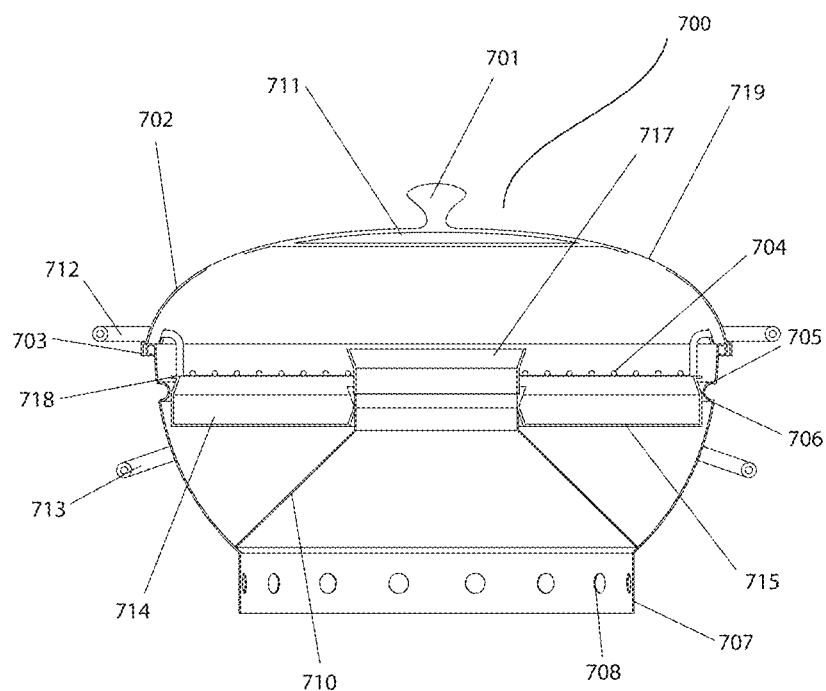
FIG. 7 shows a view of an alternative embodiment of a portable indoor/outdoor grill.

FIG. 7 shows a two-dimensional vertical cutaway view along the midline of an embodiment of an indoor/outdoor grill 700, according to some aspects of the innovations disclosed. Handle 701 is preferably a knob or similar shape to prevent the user's fingers from coming in direct contact with the hot metal of lid 702. Lid 702 fits inside and is supported by lip 703. Lid 702 may have a double-wall 710 construction that provides thermal insulation to the knob area and acts as a reflector of thermal energy onto the food being cooked. Lid 702 may also have vents 719 that may increase the temperature at the gridiron 704 when open and decrease it when closed.

In use, grill 700 is placed over a heat source, such as a gas or electric stove burner, such that the spacer 707 is roughly centered on the heat source. This should ensure that the heat source is approximately centered under the chimney top 717. Air holes 708 in spacer 707 allow sufficient air for combustion and convection within the grill 700. The spacer 707 may be permanently attached to grill 700 or may be a separate piece on which grill 700 can be placed when cooking, similar to the embodiment described in FIG. 6. In some embodiments, the height of spacer 707 may be adjustable to allow for variation in the distance of the chimney from the heat source. Although air holes 708 are shown as circular and evenly spaced, they may be any shape or configuration that permits adequate airflow for combustion and convection.

The embodiment shown in FIG. 7 has a tray assembly consisting of an outer support ring, tray 715, and handles 712. The tray assembly handles 712 protrude through cutouts in lid 702 and in the embodiment shown are manufactured integral to the tray support ring. Gridiron 704 and tray 715 are annular shaped, with the center hole of each fitting over chimney top 717. In this embodiment, gridiron 704 rests on tray 715, with the outer ring of gridiron 704 fitting around the outer lip of tray 715 as shown. The cooking process is enhanced by heat transfer due to convection from air heated by the heat source and rising through the chimney top 717, conduction from the chimney top 717 to the gridiron 704 and tray 715, convection from steam from the contents 714 of tray 715, radiation from chimney base 711 to tray 714, and radiation from the lid 702 downwards onto the gridiron 704. In the presently preferred embodiment, tray 715 has inward-leaning lips or edges 718 to prevent spills when moving the tray assembly.

Figure 7A:
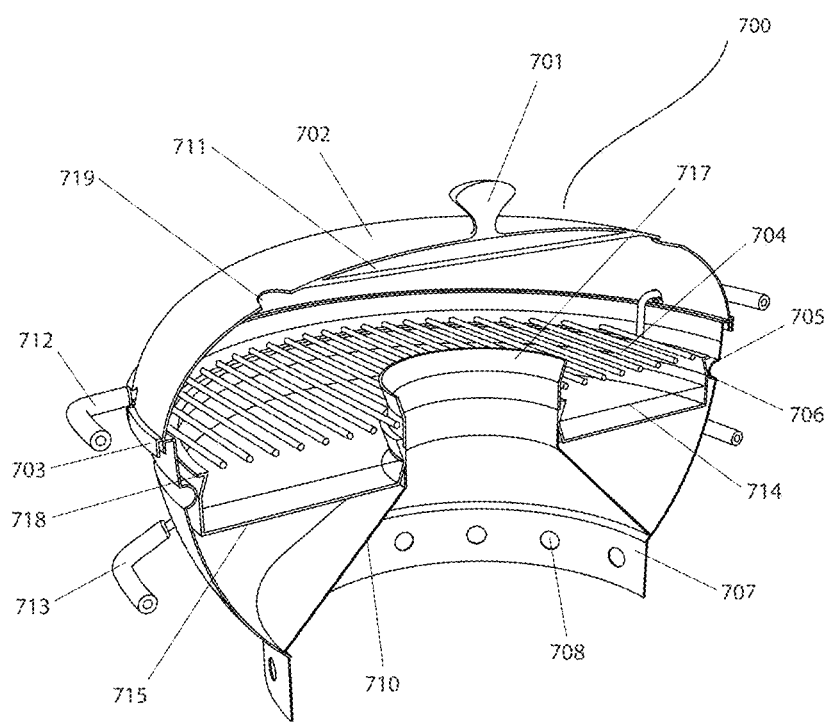
FIG. 7A shows a view of the portable indoor/outdoor grill of FIG. 7.

As can be seen in FIG. 7A, the cooking surface of gridiron 704 is over tray 715. Neither the food being prepared nor tray 715 are directly exposed to the heat source, so that convection and radiation are the primary means of heating the food and the contents of tray 715. This has the benefit that the contents of tray 715 will not boil, which would cause an undesirable amount of steam in the grill 700. In the embodiment shown, convection is enhanced by extending the chimney top above gridiron 704. Tray 715 can be filled with liquid such as water, spices, marinades, wood chips, or any suitable flavoring agent.

Figure 7B:
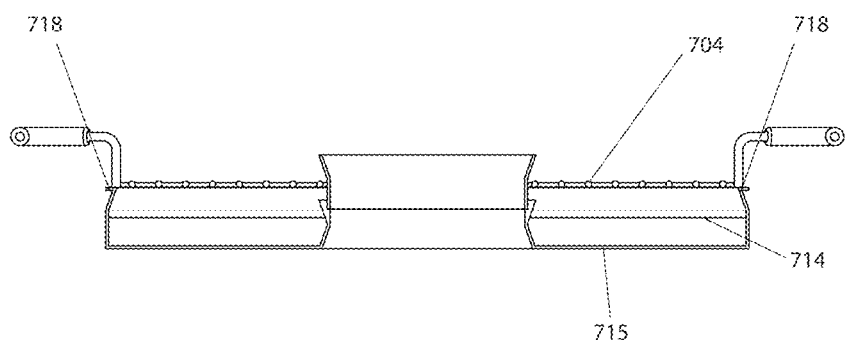
FIG. 7B shows a sectional view of the tray of the grill shown in FIG. 7.

FIG. 7B shows a cut-away view of the tray assembly. The beveled edges of the chimney top and tray lips 718 can be more clearly seen. In this embodiment, the tray lip 718 is formed by bending the edge of the tray inwards towards the center of the annular shaped tray. Some embodiments of a spill-resistant tray may also include a similar lip around the inner portion of tray to prevent liquid from spilling into the chimney. There are many ways to form a lip on a tray and the invention is not limited only to those shown.

Figure 7C:
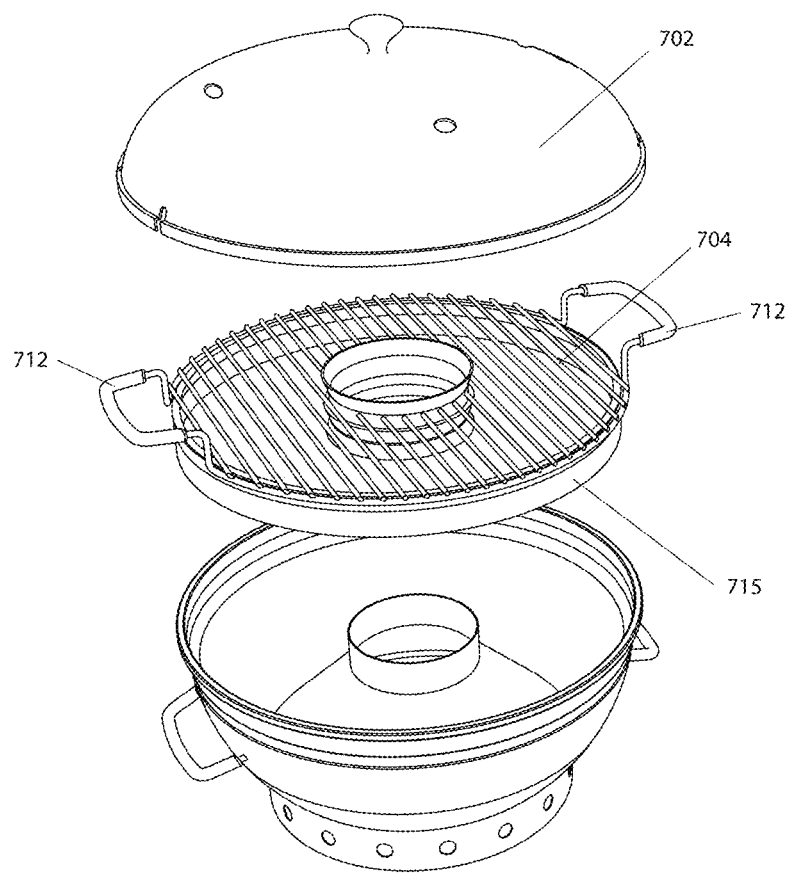
FIG. 7C shows an exploded view of the grill of FIG. 7.

FIG. 7C is an exploded view of grill 700. The vents in lid 702 can be seen in this view. Although not shown in the drawing, the vents preferably have a mechanism to adjust them open or closed such as a sliding or rotating mechanism. Additionally, how the tray assembly fits into the base is more clearly seen. In some embodiments, the chimney portion of the grill base may have beveled edges where it interlocks with the chimney portion that is part of the tray assembly.

Figure 7D:
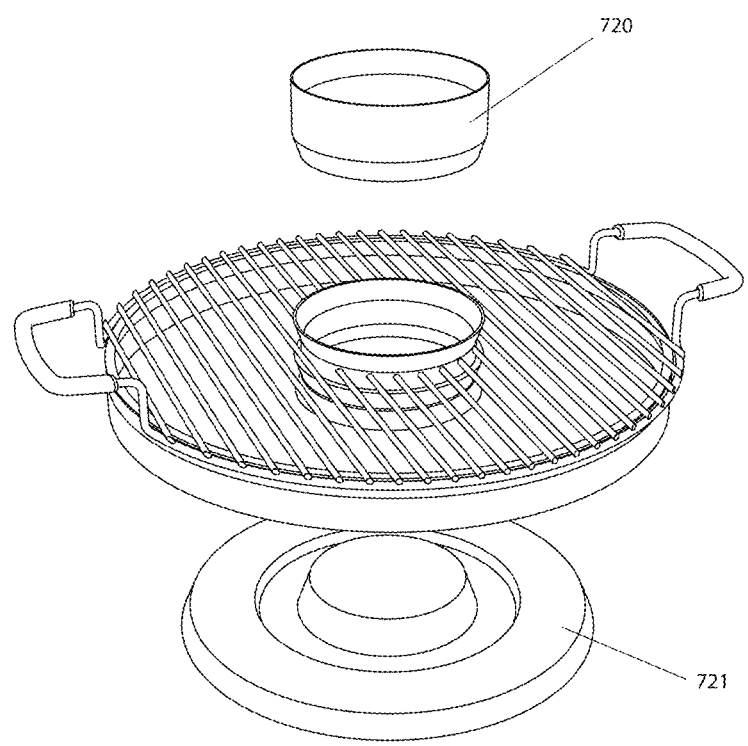
FIG. 7D shows the tray assembly of the grill of FIG. 7 along with the serving stand and sauce cup.

FIG. 7D shows the tray assembly with serving stand 721 and sauce cup 720. After cooking, the tray assembly can be removed from the grill 700 and placed on the dinner table on serving stand 721. Sauce cup 720 can be filled with various sauces, gravies, or drippings collected during the cooking process in tray 715 and placed in chimney top 717 in the middle of the tray assembly as shown. As can be seen, chimney top 717 is flared so that the beveled sauce cup 720 can sit securely in a taper. The serving stand 721 is configured with a cone frustum at its center to securely hold the beveled chimney portion of the tray assembly. Although a cone frustum is shown, any frustum that will securely hold the tray assembly may be used. For example, with a rectangular chimney cross section, a pyramid frustum may be more appropriate. The outer edge of serving stand 721 is also slanted so that a matching slope on the tray assembly will fit securely on it.

Figure 7E:
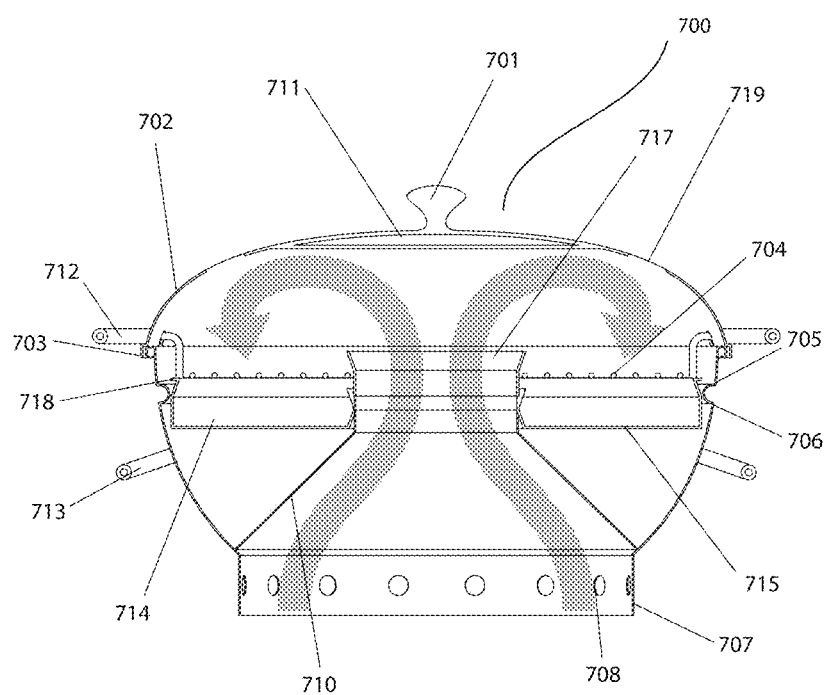
FIG. 7E shows thermal convection patterns within the portable indoor/outdoor grill embodiment shown in FIG. 7.

FIG. 7E is a heat flow diagram that shows convection currents originating from the external heat source, rising through the chimney 710, 717 and into the cooking area above and below gridiron 704. FIG. 7E and the following discussion are intended to provide a brief, general description of the thermal transfer that cooks the food. As can be seen in FIG. 7E, the convection currents will also heat the contents of tray 715. The double-walled area 711 of lid 702 will radiate heat energy toward the cooking area. Lid 702 has vents 719 which help increase the temperature in the cooking area to more than 700 F by controlling the steam saturation. Additionally, the bottom section 710 of the chimney will radiate thermal energy through the void between the chimney and the bottom of tray 715. Thus the contents 714 of tray 715 are also heated by radiant energy from chimney 710. Because the bottom of tray 715 is not directly exposed to the heat source but is heated indirectly by energy radiated by chimney 710, the tray contents 714 will not boil or evaporate too quickly.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. For example, although tray 611 has been primarily discussed above as double-walled, a person of ordinary skill in the art understands that other construction techniques that prevent boiling of the liquid could be substituted. For instance, a single wall construction may be appropriate for some embodiments. As another example, many types of heat sources are appropriate for various embodiments of the invention, such as gas, electric, or radiant stove burners, campfires, charcoal beds, portable gas burners, etc. Thus, I claim as my invention all such embodiments as may come within the scope and spirit of the following claims and equivalents thereto.

The invention claimed is:

1. A cooking device comprising:
    a gridiron;
    a cover formed to at least partially enclose the gridiron;
    a tray positioned to catch material that falls from the gridiron, the tray comprising tray integral handles protruding through the cover;
    a chimney having a chimney base and a chimney top and a chimney channel, the chimney forming an enclosed airflow passage through the gridiron and tray;
    the chimney, the gridiron, and the cover arranged such that when the chimney base is placed over a heat source, convection occurs from the chimney base and through the chimney channel and out through the chimney top, to the cover, and from the cover toward the gridiron, the cover formed with a cover inner wall forming a perpendicular surface to the convection from out through the chimney top to channel substantially all of the convection toward curved sides of the cover and down toward the gridiron;
    the chimney base and the tray arranged such that when the chimney base is placed over the heat source, heat is radiated from the chimney base toward the tray;
    the chimney top and the gridiron arranged such that when the chimney base is placed over the heat source, heat is radiated from the chimney top laterally across an upper surface of the gridiron; and
    the gridiron and the tray formed to at least partially surround the chimney top, the chimney top protruding through the gridiron and extending above it.

2. The cooking device of claim 1, further comprising:
the gridiron and the tray encircling the chimney top.

3. The cooking device of claim 1, further comprising:
the chimney top and the tray arranged such that when the chimney base is placed over the heat source, heat is conducted from the chimney top into the tray.

4. The cooking device of claim 1, further comprising:
the chimney, the gridiron, and the cover arranged such that convected air exits the chimney top between (a) a plane comprising the gridiron, and (b) the cover.

5. The cooking device of claim 1, further comprising:
the cover comprising adjustable vents in the cover above the chimney top.

6. The cooking device of claim 1, further comprising:
the tray and the gridiron and the chimney configured to lift free as a unit from the chimney base.

7. The cooking device of claim 1, further comprising:
vents in the cover that are adjustable to control an amount of heat and/or steam that accumulates between the cover and the gridiron when the chimney base is placed over the heat source.

8. The cooking device of claim 1, further comprising:
a sauce dish formed to extend at least partially into the chimney top.

9. The cooking device of claim 8, further comprising:
the tray, the gridiron, and the sauce dish formed to extend at least partially into the chimney top configured to lift free as a unit from the chimney.

10. The cooking device of claim 8, further comprising:
at least at a portion of the cover receiving convected air exiting from the chimney top, the portion of the cover receiving the convected air having a double wall construction with space between the double walls.

11. The cooking device of claim 6, further comprising:
a stand formed to accept and support the tray and the gridiron above a horizontal surface when the tray and the gridiron are lifted free of the chimney and placed on the stand.

\* \* \* \* \*